United States Patent Office 3,576,666
Patented Apr. 27, 1971

3,576,666
COATED REFRACTORY STRUCTURAL MEMBERS
Ivan B. Cutler, 4036 Golden Circle,
Salt Lake City, Utah 84117
No Drawing. Continuation-in-part of application Ser. No. 513,554, Dec. 13, 1965. This application May 5, 1969, Ser. No. 821,979
Int. Cl. C04b 41/06
U.S. Cl. 117—106          11 Claims

ABSTRACT OF THE DISCLOSURE

This invention relates to a novel refractory structural member such as a refractory brick or block, referred to hereinafter as a brick, that is protected from hydration by means of subjecting the brick to an environment of an elevated temperature and a reactive gas phase for a predetermined period of time to thus form a protective coating on the brick.

---

This application is a continuation-in-part of U.S. patent application Ser. No. 513,554, filed Dec. 13, 1965, now abandoned.

This invention relates generally to refractory structural members which require protection from hydration, due to water in the atmosphere or water in liquid form. The invention is applicable to refractory bricks containing oxides such as calcium oxide, magnesium oxide, and other oxides that are subject to hydration. According to the present invention, protection from hydration is achieved by reacting the refractory oxide of the refractory brick with an externally applied reactive gas phase at high temperature. This forms an insoluble protective compound on the surface of the rafractory brick which is somewhat analogous, in a general way, to the formation of a protective oxidation film on metals, such as aluminum, that protects the metal from further oxidation.

Because calcium oxide in particular (as well as certain other high temperature refractory oxides) reacts with water vapor in the atmosphere and water as a liquid to form calcium hydroxide at the interface between the crystalline calcium oxide and the gaseous or liquid water phase, several previous efforts have been made to solve the stated hydration problem.

One prior art technique comprises either fusing or sintering the calcium oxide of the refractory brick into a generally non-porous layer at the exposed surface which, in theory, is impermeable to an external water-bearing environment. However, practical experience verifies that such a technique merely reduces the surface area of the exposed calcium oxide and thus only slows down, but does not substantially prevent hydration.

Furthermore, it is not practical to prepare a large refractory shape by sintering the entire refractory mass to a completely dense, non-porous mass. The sintering shrinkage is far too great to obtain a refractory shape having dimensional stability.

Sintering the calcium oxide or calcium oxide containing material can be achieved in the presence of a second phase, such as calcium titanate or a silicious glass. These materials are ordinarily liquid at high temperature and coat the calcium oxide particles, thereby protecting calcium oxide from hydration attack by either liquid or gaseous water. The significant disadvantage of this liquid coating technique, however, is that it reduces the high temperature usefulness of the calcium oxide by reducing its refractoriness since the calcium oxide or calcium oxide containing material cannot be used at a temperature higher than the temperature at which the coating was prepared.

It has also been proposed that addition of certain additives such as $TiO_2$, MnO, FeO, $ZrO_2$, $H_2CO_3$, etc., to the refractory material and use of high temperatures to sinter or otherwise heat the material might help insulate refractory oxides from hydration. Such proposals have not met with commercial acceptance apparently because of poor quantity and quality control and burdensome manufacturing problems involved. Also, the usual manufactured refractory contains 10 to 15% porosity. During long periods of storage this condition will permit the water in the atmosphere to attack the refractory material.

In view of the foregoing, it will be a valuable contribution to the art of refractory bricks to provide a system for substantially insulating refractory oxides such as calcium oxide, from hydration by water contained in an external environment. The present invention provides such a system.

In summary, the present invention comprises methods of forming a protecting coating on the calcium oxide, e.g. burned dolomite and other refractory oxide-containing materials of a refractory brick by reacting an external gas phase with the exposed surfaces of the refractory brick at elevated temperatures, the coating substantially preventing hydration of the refractory brick. Thus, for example, a coating or film of calcium carbonate is formed by reacting the exposed calcium oxide surfaces of the refractory structural member with an externally applied carbon dioxide gas. A coating of calcium phosphate is similarly achieved by producing a reaction between the calcium oxide surfaces of the refractory brick and phosphorous and oxygen or a volatile phosphate gas. Likewise, a calcium sulphate is created by reaction of the calcium oxide surfaces of the refractory structural member with sulphur and oxygen or with $SO_2$ or $SO_3$ gas. In like manner, hydration-preventing coatings of fluoride and silicate are created. The reactions are carried out at appropriate high temperatures and a coherent, insoluble, impervious film is formed on the surface of the refractory oxide. This impervious film substantially prevents hydration.

A significant advantage of this invention is that it may be applied to any finished refractory shape, with the external gas phase penetrating into the open porosity of the material so that interior surfaces, which otherwise could be reached by an external water-bearing environment, as well as exterior surfaces are coated with the insoluble impervious compound.

Another advantage exists as the mentioned films or coatings of the refractory brick tend to decompose at very high temperature. By accommodating such decomposition, use of the full refractory possibilities of the oxide is achieved without forming a liquid phase to limit the usefulness. Of course, where such decomposition would contaminate any adjacent substance to which the refractory brick is exposed during use, as for example molten metal, this approach would not be used.

With the foregoing in mind, it is a primary object of this invention to provide a refractory brick comprised of a hydratable material, such as calcium oxide with a water impervious coating for the purpose of preventing hydration of the refractory brick after manufacture and before its use in a high temperature environment wherein the temperature of the environment exceeds the dissociation temperature of the coating.

These and other objects and features of the invention will become more fully apparent from the following description and appended claims.

A suitable impervious coating, according to the present invention, is made by reacting the refractory oxide of the brick in an appropriate high temperature atmosphere for a desired length of time, determined in part by the diffusion rate of the reacting gas through the coating as it becomes progressively thicker. The longer the reaction time the thicker will be the coating. Thus, for example, a coating of calcium carbonate may be built up on the surface of calcium oxide at elevated temperatures up to the decomposition temperature of the coating. As a practical matter, the rate of reaction has been found to be much more rapid at high temperatures than at low temperatures.

During actual testing of this invention, temperatures on the order of between 400 and 800° C. have been successfully used to create a $CaCO_3$ film on calcium oxide through reacting the calcium oxide with a pure $CO_2$ atmosphere, applied externally to the refractory brick. The maximum temperature, however, is depended upon the partial pressure of the carbon dioxide. A temperature approaching on the order of 890° C. may be used in a pure carbon dioxide atmosphere. Temperatures below this level must be applied when only part of the atmosphere is carbon dioxide.

Any suitable source of carbon dioxide may be used. For example, the carbon dioxide may be supplied by burning carbonation material in the presence of oxygen or air, remembering that only part of the atmosphere so created will consist of carbon dioxide. Consequently, somewhat lower maximum temperatures must then be employed as required by thermodynamic relationships.

The lowest permissible temperature which will accommodate the reaction is determined by the water vapor content of the high temperature atmosphere. A lower water vapor content in the gas phase will allow a lower reaction temperature to be used. As the water vapor content of the gas phase increases, higher temperatures must be used to successfully coat the refractory oxide with a suitable hydration-preventing film. When the water vapor content approaches 100% water vapor, no temperature below the decomposition point of calcium hydroxide may be used. This temperature is generally accepted in the art to be about 580° C. When water vapor is entirely eliminated, temperatures as low as 300 and 400° C. may be used, where a slow rate of reaction is not objectionable. Normally, however, such low temperatures are to be avoided due to the relatively slow rates of reaction achieved, when compared with use of maximum temperatures.

A calcium phosphate coating may be created upon the surface of calcium oxide contained in a refractory by heating the refractory in the presence of a phosphorous or a phosphorous oxide gas and excess oxygen. Such a phosphate coating may be applied up to the melting point of the calcium phosphate, with the most desirable reaction temperature falling in the range of on the general order of 1000 to 1400° C.

Likewise, calcium sulphate coatings upon calcium oxide may be created by use of sulphur or a sulphur oxide gas, such as $SO_2$, and oxygen or directly by use of $SO_3$. Since calcium sulphate melts at about 1450° C., the coating reaction must take place below this melting temperature.

Similar temperature intervals are applicable to magnesium oxide, with a maximum for creation of a calcium magnesium carbonate coating being less than on the order of about 900° C. and for a magnesium sulphate coating being less than on the order of about 1100 C. and for a phosphate coating being less than on the order of about 1300° C. These maximum temperatures are determined primarily by the nature of the coating formed and in particular the decomposition or melting point thereof. The maximum temperatures are always decreased in the presence of a partial pressure gas, that is less than 100%.

In like manner, a calcium fluoride coating can be created by heating the refractory in the presence of fluorine or hydrogen fluoride, through such gas phases are difficult to work with at high temperatures and thus pose some safety problems. A temperature of operation for this reaction should be below on the order of about 1360° C., 1200° C., being one suitable temperature.

In a similar manner, calcium silicate may be formed on the surface of calcium oxide by heating the calcium oxide in the presence of a vapor of silicon tetrafluoride, silicon tetrachloride, or another suitable volatile organic silicon compound. The formation of calcium silicate coating must take place in a high temperature atmosphere, the maximum temperature being not greater than on the order of about 1400° C.

What is claimed and desired to be secured by United States Letters Patent is:

1. A refractory brick protected from hydration by an anti-hydration coating formed on the surface of said brick as an integral part of said brick wherein said coating protects said brick from hydrattion between the time of formation of said coating on said brick and the use of said brick in an elevated temperature environment wherein said temperature exceeds the dissociation temperature of said coating; said coating being comprised of a reaction product of a chemical reaction between a refractory material comprising said brick and a gaseous phase reactive with said refractory material, said reaction occurring at an elevated temperature not in excess of the dissociation temperature of said coating, said gaseous phase comprising a gas from the family consisting of carbon dioxide, sulphur oxide, phosphorous oxide, fluorine, hydrogen fluoride, silicon tetrafluoride, and silicon tetrachloride, and said refractory material being comprised of refractory material from the family of refractory materials consisting of calcium oxide and magnesium oxide.

2. In a refractory brick as defined in claim 1 wherein the brick is comprised of calcium oxide.

3. In a refractory brick as defined in claim 1 wherein the brick is comprised of magnesium oxide.

4. In a refractory brick as defined in claim 1 wherein the reactive gas phase is comprised of carbon dioxide.

5. In a refractory brick as defined in claim 1 wherein the reactive gase phase is comprised of sulphur oxide.

6. In a refractory brick as defined in claim 1 wherein the reactive gas phase is comprised of phosphorous oxide.

7. In a refractory brick as defined in claim 1 wherein the reactive gas phase is comprised of fluorine.

8. In a refractory brick as defined in claim 1 wherein the reactive gas phase is comprised of hydrogen fluoride.

9. In a refractory brick as defined in claim 1 wherein the reactive gas phase is comprised of silicon tetrafluoride.

10. In a refractory brick as defined in claim 1 wherein the reactive gas phase is comprised of silicon tetrachloride.

11. A refractory brick protected from hydration by an anti-hydration coating formed on the surface of said brick as an integral part of said brick wherein said coating protects said brick from hydration from the time of formation of said coating on said brick and after the use of said brick in an elevated temperature environment wherein said temperature does not exceed the dissociation temperature of said coating; said coating being comprised of a reaction product of a chemical reaction between a refractory material comprising said brick and a gaseous phase reactive with said refractory material, said reaction occurring at an elevated temperature not in excess of the dissociation temperature of said coating, said gaseous phase comprising a gas from the family consisting of carbon dioxide, sulphur oxide, phosphorous oxide, fluorine, hydrogen fluoride, silicon tetrafluoride, and silicon tetrachloride, and said refractory material being comprised of refractory material from the family of refractory materials consisting of calcium oxide and magnesium oxide.

References Cited

UNITED STATES PATENTS

| | | | |
|---|---|---|---|
| 1,449,696 | 3/1923 | Pike | 23—66 |
| 2,107,857 | 2/1938 | Emmett | 23—108 |
| 2,657,154 | 10/1953 | Brouwer | 117—54 |
| 2,741,565 | 7/1956 | Halversen | 117—54 |
| 2,888,377 | 5/1959 | Allen | 23—110X |
| 3,121,019 | 2/1964 | Blat | 23—66X |

OTHER REFERENCES

Mellor, Comp. Treatise on Inorganic and Theo. Chem., vol. 3, 1923, pp. 652–657, 688 and 689 relied upon.

ALFRED L. LEAVITT, Primary Examiner

A. GRIMALDI, Assistant Examiner

U.S. Cl. X.R.

106—70; 117—118, 123, 169